(No Model.)
J. S. ALEXANDER.
VENT FOR BUCKETS.
No. 458,883. Patented Sept. 1, 1891.
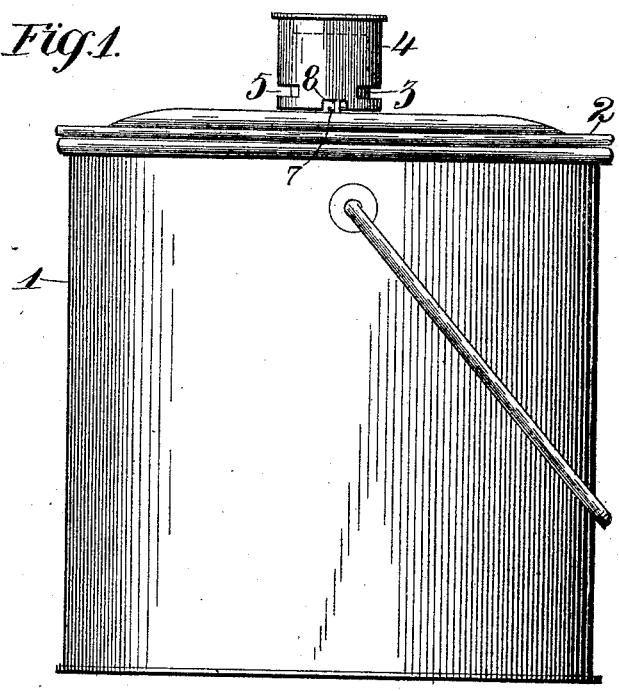
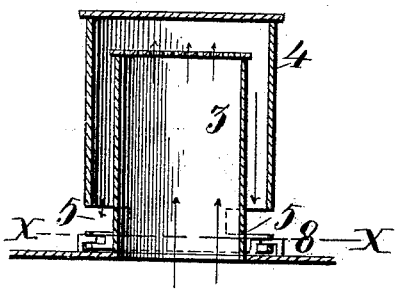
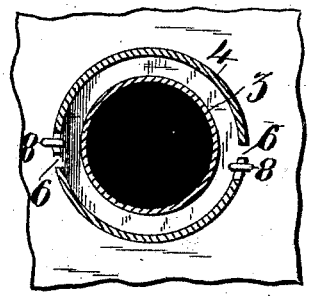
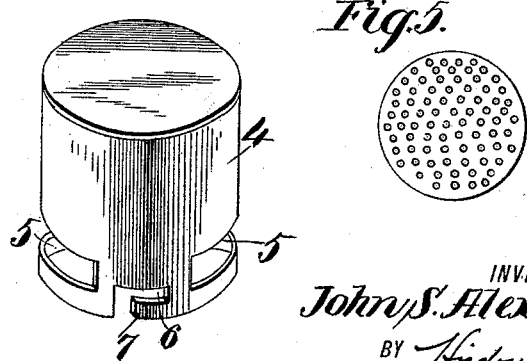
WITNESSES:
INVENTOR
John S. Alexander
BY Higdon & Higdon
ATTORNEYS

United States Patent Office.

JOHN S. ALEXANDER, OF AUBURN, MISSOURI.

VENT FOR BUCKETS.

SPECIFICATION forming part of Letters Patent No. 458,883, dated September 1, 1891.

Application filed December 4, 1890. Serial No. 373,558. (No model.)

*To all whom it may concern:*

Be it known that I, JOHN S. ALEXANDER, of the city of Auburn, Lincoln county, State of Missouri, have invented certain new and useful Improvements in Vents for Buckets and other Receptacles, of which the following is a full, clear, and exact description, reference being had to the accompanying drawings, forming a part hereof.

My invention relates to improvements in vents for buckets and other receptacles; and it consists in the novel arrangement and combination of parts, as will be more specifically hereinafter described, and designated in the claim.

In the drawings, Figure 1 is a side elevation of a bucket or pail with my invention applied to the lid thereof. Fig. 2 is a longitudinal section of my invention. Fig. 3 is a cross-section of the same, taken on line $xx$ of Fig. 2. Fig. 4 is a perspective view of a metallic cap which I employ in carrying out my invention, and Fig. 5 is a top plan view of an internally-communicating hollow projection which is embodied in my invention.

The object of my invention is to provide a means for the escape of volatile products arising from the substance contained in the receptacle on which my device is applied. It is a well-known fact that, for instance, when fresh milk in its tepid state is received in any receptacle the gas arising therefrom will cause said milk to become fetid if it (the gas) is not permitted to escape.

My invention, when applied to such receptacles, effectively permits the gas or odor to escape without allowing any extraneous matter to pass into the receptacle and be commingled with the milk or inclosed substance. It is well known in culinary pursuits that it is necessary to permit the gas and steam to escape and at the same time prevent the introduction of any extraneous matter.

Referring to the drawings, 1 represents an ordinary bucket or pail with a lid 2 applied thereto.

3 indicates an internally-communicating hollow projection which is attached to the lid, or may be attached to other portions of the receptacle, if desired; or it may be secured to a small sheet of tin or other suitable substance, and then said sheet may be soldered or attached to the lid or other portion of the bucket in any suitable and mechanical manner. But the construction and application of said hollow projection should be so effected that its inclosed space is always in communication with the inclosed space of the receptacle to which it is applied. The closed end of said hollow projection is provided with a series of perforations, as shown in Fig. 5, to permit volatile products to pass therethrough.

4 represents a cap made of metal or other suitable substance, which is adapted to pass freely over the hollow projection 3. Said cap is of greater longitudinal and diametrical dimensions than projection 3, so that when the cap is placed over said projection in its functional operation there will be a small space formed between the inner surface of said cap and the exterior surface of said projection for the volatile products to freely pass and find an exit. Said cap 4 is also provided with elongated slots or perforations 5 to permit the exit of the accumulated volatile products contained therein, and also with a right-angle depression 6. The construction of said right-angle depression in the cap at its base results in the formation of a small projection 7, which projection is adapted to pass under a retaining-hook 8, secured to the lid of the receptacle, which will hold said cap in its normal and functional position.

When my device is placed on any receptacle to effect the results for which it is constructed, the volatile products, as shown by arrows in Fig. 2, being of a light specific gravity, will rise upwardly and pass through the perforations formed in the top of the hollow projections 3, strike the top portion of the metallic cap 4, and, meeting with substantial resistance, will be deflected and pass downwardly in the space formed between the interior surface of said cap and the exterior surface of said hollow projection and find an exit through perforations or slots 5. The top portion of cap 4 being solid or closed will prevent the introduction of any extraneous substance into the receptacle on which my device is applied.

It is readily perceived by the unique construction of my device that while it permits the escape of all volatile products it has an additional function of preventing the introduction of any foreign matter into the substance contained in the receptacle.

Having fully described my invention, what I claim is—

The combination, with a cover of a vessel of capacity, of a projection 3 thereon, communicating with the interior of the said vessel and having a reticulated upper end, hooks secured to the said cover contiguous to the base of the said projection, and a cap 4, having a closed upper end and adapted to fit loosely over the said projection, the said cap having elongated slots 5 near its base and having projections 7 thereon adapted to slide under the said hooks, as described.

In testimony whereof I affix my signature in presence of two witnesses.

JOHN S. ALEXANDER.

Witnesses:
GEORGE T. DUNN,
JNO. H. MURPHY.